US012563480B2

(12) United States Patent
Xiong et al.

(10) Patent No.: US 12,563,480 B2
(45) Date of Patent: Feb. 24, 2026

(54) APPARATUS, METHOD, AND COMPUTER PROGRAM FOR DISCOVERING A GROUP OF UNMANNED AERIAL VEHICLES

(71) Applicant: Nokia Technologies Oy, Espoo (FI)

(72) Inventors: Zhilan Xiong, Bristol (GB); Man Hung Ng, Wiltshire (GB); Matthew Baker, Cambridgeshire (GB); Ping-Heng Kuo, London (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 481 days.

(21) Appl. No.: 18/036,234

(22) PCT Filed: Nov. 13, 2020

(86) PCT No.: PCT/EP2020/082054
§ 371 (c)(1),
(2) Date: May 10, 2023

(87) PCT Pub. No.: WO2022/100844
PCT Pub. Date: May 19, 2022

(65) Prior Publication Data
US 2023/0403639 A1      Dec. 14, 2023

(51) Int. Cl.
*H04W 4/00*        (2018.01)
*H04W 48/16*        (2009.01)
(52) U.S. Cl.
CPC .................................. *H04W 48/16* (2013.01)
(58) Field of Classification Search
CPC ..... H04W 48/16; H04W 88/02; H04W 88/04; H04W 92/18; H04W 8/00; H04W 24/10

USPC .......................................................... 455/434
See application file for complete search history.

(56) References Cited

U.S. PATENT DOCUMENTS

| | | | | |
|---|---|---|---|---|
| 9,253,753 B2 * | 2/2016 | Rubin | ..................... | H04W 4/40 |
| 10,064,212 B2 * | 8/2018 | Faurie | ................... | H04W 72/23 |
| 10,609,601 B2 * | 3/2020 | Wei | ................... | H04W 36/0061 |
| 10,827,380 B2 * | 11/2020 | Rao | ................... | H04W 28/0268 |

(Continued)

OTHER PUBLICATIONS

"3$^{rd}$ Generation Partnership Project; Technical Specification Group Services and System Aspects; Study on system enhancement for Proximity based Services (ProSe) in the 5G System (5GS) (Release 17)," 3GPP TR 23.752 V0.6.0, France, Nov. 2, 2020, pp. 1-176.

(Continued)

*Primary Examiner* — Marceau Milord
(74) *Attorney, Agent, or Firm* — Carter, DeLuca & Farrell LLP

(57) ABSTRACT

The disclosure relates to an apparatus including circuitry for: selecting at least one covered user equipment among a plurality of covered user equipment inside the coverage area of the apparatus; sending, to the at least one covered user equipment, a searching message, wherein the searching message includes an indication that the at least one covered user equipment is to send a searching result message to the apparatus, wherein the searching result message includes an indication of at least one non-covered user equipment located outside the coverage area of the apparatus and inside a coverage area of the at least one covered user equipment; and receiving, from the at least one covered user equipment, the searching result message.

22 Claims, 7 Drawing Sheets

---

600 Apparatus selecting at least one covered user equipment among a plurality of covered user equipment inside the coverage area of the apparatus

↓

602 Apparatus sending, to the at least one covered user equipment, a searching message, wherein the searching message comprises an indication that the at least one covered user equipment is to send a searching result message to the apparatus

↓

606 Apparatus receiving, from the at least one covered user equipment, the searching result message

(56) References Cited

U.S. PATENT DOCUMENTS

| | | | | |
|---|---|---|---|---|
| 11,057,854 | B2 * | 7/2021 | Nguyen | H04W 72/0453 |
| 11,259,274 | B2 * | 2/2022 | Hoang | H04W 72/541 |
| 11,497,025 | B2 * | 11/2022 | Loehr | H04W 52/383 |
| 11,838,936 | B2 * | 12/2023 | Kung | H04W 72/54 |
| 11,868,145 | B1 * | 1/2024 | Lopez | G08G 5/22 |
| 2017/0243485 | A1 * | 8/2017 | Rubin | H04W 4/46 |
| 2018/0092067 | A1 * | 3/2018 | Liu | H04W 72/52 |
| 2019/0159150 | A1 * | 5/2019 | Nguyen | H04W 56/002 |
| 2019/0239112 | A1 * | 8/2019 | Rao | H04L 1/08 |
| 2020/0022089 | A1 * | 1/2020 | Guo | H04W 52/242 |
| 2020/0184824 | A1 * | 6/2020 | Yang | G08G 1/167 |
| 2020/0314612 | A1 * | 10/2020 | Kang | H04W 72/20 |
| 2020/0359445 | A1 * | 11/2020 | Wu | H04W 76/28 |
| 2021/0235328 | A1 * | 7/2021 | Hui | H04W 72/56 |
| 2021/0360616 | A1 * | 11/2021 | Yi | H04L 5/0053 |
| 2022/0039163 | A1 * | 2/2022 | Park | H04B 7/0695 |

OTHER PUBLICATIONS

"3rd Generation Partnership Project; Technical Specification Group Services and System Aspects; Proximity-based services (ProSe); Stage 2 (Release 16)," 3GPP TS 23.303 V16.0.0, France, Jul. 9, 2020, pp. 1-130.
Lakew, Demeke S. et al, "Routing in Flying Ad Hoc Networks: A Comprehensive Survey," IEEE Communications Surveys & Tutorials, vol. 22, No. 2, Second Quarter 2020, Mar. 23, 2020.

* cited by examiner

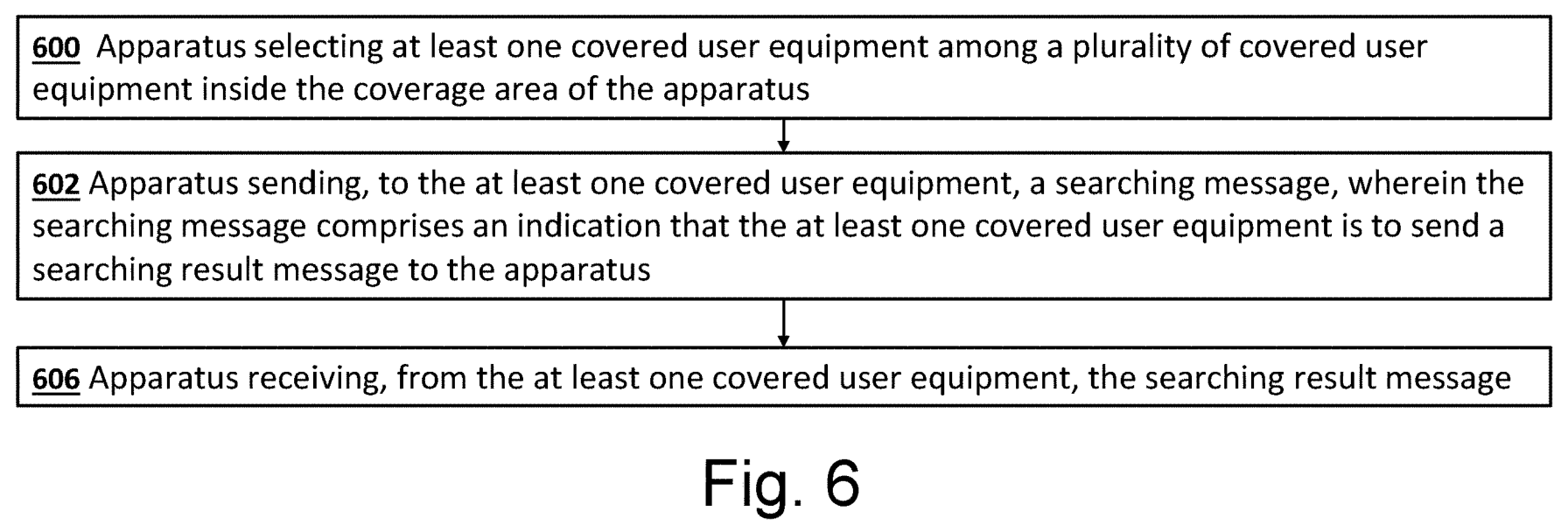

600 Apparatus selecting at least one covered user equipment among a plurality of covered user equipment inside the coverage area of the apparatus

602 Apparatus sending, to the at least one covered user equipment, a searching message, wherein the searching message comprises an indication that the at least one covered user equipment is to send a searching result message to the apparatus

606 Apparatus receiving, from the at least one covered user equipment, the searching result message

Fig. 6

APPARATUS, METHOD, AND COMPUTER PROGRAM FOR DISCOVERING A GROUP OF UNMANNED AERIAL VEHICLES

CROSS REFERENCE TO RELATED APPLICATION

This patent application is a U.S. National Stage application of International Patent Application Number PCT/EP2020/082054 filed Nov. 13, 2020, which is hereby incorporated by reference in its entirety.

FIELD OF THE DISCLOSURE

The present disclosure relates to an apparatus, a method, and a computer program for searching user equipment in a communication system.

BACKGROUND

A communication system can be seen as a facility that enables communication sessions between two or more entities such as user terminals, base stations/access points and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet. In a wireless communication system at least a part of a communication session between at least two stations occurs over a wireless link.

A user can access the communication system by means of an appropriate communication device or terminal. A communication device of a user is often referred to as user equipment (UE) or user device. A communication device is provided with an appropriate signal receiving and transmitting apparatus for enabling communications, for example enabling access to a communication network or communications directly with other users. The communication device may access a carrier provided by a station or access point and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known as the long-term evolution (LTE) or the Universal Mobile Telecommunications System (UMTS) radio-access technology. Another example communication system is so called 5G radio or new radio (NR) access technology.

SUMMARY

According to an aspect there is provided an apparatus comprising means for: selecting at least one covered user equipment among a plurality of covered user equipment inside the coverage area of the apparatus; sending, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receiving, from the at least one covered user equipment, the searching result message.

The at least one covered user equipment may be at an edge of the coverage area of the apparatus Selecting at least one covered user equipment may comprises: identifying a list of covered user equipment and assigning a priority to each covered user equipment; and selecting at least one covered user equipment with a highest priority within the list.

The priority may be determined based on a distance between the at least one covered user equipment and the apparatus and/or a quality of service between the at least one covered user equipment and the apparatus; and the at least one covered user equipment with the highest priority may be the at least one covered user equipment with the longest distance between the at least one covered user equipment and the apparatus and/or the lowest quality of service above a threshold between the at least one covered user equipment and the apparatus.

The apparatus may comprising means for: selecting at least one subsequent covered user equipment with a subsequent highest priority within the list; sending, to the at least one subsequent covered user equipment, a searching message; and receiving, from the at least one subsequent covered user equipment, the searching result message, wherein the selecting, the sending and the receiving are repeated until a condition is met.

Selecting at least one covered user equipment may comprise: identifying a list of covered user equipment, each covered user equipment having a same priority; and selecting at least one covered user equipment randomly within the list.

The apparatus may means for: selecting at least one subsequent covered user equipment randomly within the list; sending, to the at least one subsequent covered user equipment, a searching message; and receiving, from the at least one subsequent covered user equipment, the searching result message, wherein the selecting, the sending and the receiving are repeated until a condition is met.

Identifying a list of covered user equipment may comprise: receiving the list of covered user equipment from a network or an apparatus controller.

Each covered user equipment may have a priority determined by the apparatus or by the network or the apparatus controller.

Selecting at least one covered user equipment may comprise: identifying a plurality of lists of covered user equipment, each list having a different priority; selecting a list with a highest priority; and selecting at least one covered user equipment within the selected list.

The apparatus may comprise means for: selecting at least one subsequent covered user equipment within the selected list; sending, to the at least one subsequent covered user equipment, a searching message; and receiving, from the at least one subsequent covered user equipment, the searching result message, wherein the selecting, the sending and the receiving are repeated until a condition is met.

The condition may be that each non-covered user equipment has been indicated to the apparatus in at least one searching result message or each covered user equipment within the list has been selected.

The apparatus may comprise means for: receiving information indicating a radio resource to be used by the apparatus to send a searching message to the at least one covered user equipment.

The apparatus may comprise means for: receiving information indicating a beam to be used by the apparatus to send a searching message to the at least one covered user equipment.

The searching message may be a unicast message.

The searching message may be a multicast message or a broadcast message.

The multicast message or the broadcast message may comprise information indicating the at least one covered user equipment and/or time instants for the at least one covered user equipment to send a discovery message to the at least one non-covered user equipment, the discovery message may comprise an indication that the at least one non-covered user equipment is to send a discovery result message to the at least one covered user equipment; and the discovery result message may comprise an indication that the at least one non-covered user equipment received a discovery message.

The apparatus may comprise means for: sending, to the at least one covered user equipment, a data relaying message, the relaying message may comprise an indication that the at least one covered user equipment has been selected to relay data between the apparatus and the at least one non-covered user equipment.

The apparatus may be a user equipment.

The user equipment and/or the at least one covered user equipment may be an unmanned aerial vehicle.

According to an aspect there is provided an apparatus comprising at least one processor and at least one memory including computer code for one or more programs, the at least one memory and the computer code configured, with the at least one processor, to cause the apparatus at least to: select at least one covered user equipment among a plurality of covered user equipment inside the coverage area of the apparatus; send, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receive, from the at least one covered user equipment, the searching result message.

The at least one covered user equipment may be at an edge of the coverage area of the apparatus Selecting at least one covered user equipment may comprises: identifying a list of covered user equipment and assigning a priority to each covered user equipment; and selecting at least one covered user equipment with a highest priority within the list.

The priority may be determined based on a distance between the at least one covered user equipment and the apparatus and/or a quality of service between the at least one covered user equipment and the apparatus; and the at least one covered user equipment with the highest priority may be the at least one covered user equipment with the longest distance between the at least one covered user equipment and the apparatus and/or the lowest quality of service above a threshold between the at least one covered user equipment and the apparatus.

The at least one memory and the computer code may be configured, with the at least one processor, to cause the apparatus at least to: select at least one subsequent covered user equipment with a subsequent highest priority within the list; send, to the at least one subsequent covered user equipment, a searching message; and receive, from the at least one subsequent covered user equipment, the searching result message, wherein the selecting, the sending and the receiving are repeated until a condition is met.

Selecting at least one covered user equipment may comprise: identifying a list of covered user equipment, each covered user equipment having a same priority; and selecting at least one covered user equipment randomly within the list.

The at least one memory and the computer code may be configured, with the at least one processor, to cause the apparatus at least to: select at least one subsequent covered user equipment randomly within the list; send, to the at least one subsequent covered user equipment, a searching message; and receive, from the at least one subsequent covered user equipment, the searching result message, wherein the selecting, the sending and the receiving are repeated until a condition is met.

Identifying a list of covered user equipment may comprise: receiving the list of covered user equipment from a network or an apparatus controller.

Each covered user equipment may have a priority determined by the apparatus or by the network or the apparatus controller.

Selecting at least one covered user equipment may comprise: identifying a plurality of lists of covered user equipment, each list having a different priority; selecting a list with a highest priority; and selecting at least one covered user equipment within the selected list.

The at least one memory and the computer code may be configured, with the at least one processor, to cause the apparatus at least to: select at least one subsequent covered user equipment within the selected list; send, to the at least one subsequent covered user equipment, a searching message; and receive, from the at least one subsequent covered user equipment, the searching result message, wherein the selecting, the sending and the receiving are repeated until a condition is met.

The condition may be that each non-covered user equipment has been indicated to the apparatus in at least one searching result message or each covered user equipment within the list has been selected.

The at least one memory and the computer code may be configured, with the at least one processor, to cause the apparatus at least to: receive information indicating a radio resource to be used by the apparatus to send a searching message to the at least one covered user equipment.

The at least one memory and the computer code may be configured, with the at least one processor, to cause the apparatus at least to: receive information indicating a beam to be used by the apparatus to send a searching message to the at least one covered user equipment.

The searching message may be a unicast message.

The searching message may be a multicast message or a broadcast message.

The multicast message or the broadcast message may comprise information indicating the at least one covered user equipment and/or time instants for the at least one covered user equipment to send a discovery message to the at least one non-covered user equipment, the discovery message may comprise an indication that the at least one non-covered user equipment is to send a discovery result message to the at least one covered user equipment; and the discovery result message may comprise an indication that the at least one non-covered user equipment received a discovery message.

The at least one memory and the computer code may be configured, with the at least one processor, to cause the apparatus at least to: send, to the at least one covered user equipment, a data relaying message, the relaying message may comprise an indication that the at least one covered user equipment has been selected to relay data between the apparatus and the at least one non-covered user equipment.

The apparatus may be a user equipment.

The user equipment and/or the at least one covered user equipment may be an unmanned aerial vehicle.

According to an aspect there is provided an apparatus comprising circuitry configured to: select at least one covered user equipment among a plurality of covered user equipment inside the coverage area of the apparatus; send, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receive, from the at least one covered user equipment, the searching result message.

The at least one covered user equipment may be at an edge of the coverage area of the apparatus Selecting at least one covered user equipment may comprises: identifying a list of covered user equipment and assigning a priority to each covered user equipment; and selecting at least one covered user equipment with a highest priority within the list.

The priority may be determined based on a distance between the at least one covered user equipment and the apparatus and/or a quality of service between the at least one covered user equipment and the apparatus; and the at least one covered user equipment with the highest priority may be the at least one covered user equipment with the longest distance between the at least one covered user equipment and the apparatus and/or the lowest quality of service above a threshold between the at least one covered user equipment and the apparatus.

The apparatus may comprise circuitry configured to: select at least one subsequent covered user equipment with a subsequent highest priority within the list; send, to the at least one subsequent covered user equipment, a searching message; and receive, from the at least one subsequent covered user equipment, the searching result message, wherein the selecting, the sending and the receiving are repeated until a condition is met.

Selecting at least one covered user equipment may comprise: identifying a list of covered user equipment, each covered user equipment having a same priority; and selecting at least one covered user equipment randomly within the list.

The apparatus may comprise circuitry configured to: select at least one subsequent covered user equipment randomly within the list; send, to the at least one subsequent covered user equipment, a searching message; and receive, from the at least one subsequent covered user equipment, the searching result message, wherein the selecting, the sending and the receiving are repeated until a condition is met.

Identifying a list of covered user equipment may comprise: receiving the list of covered user equipment from a network or an apparatus controller.

Each covered user equipment may have a priority determined by the apparatus or by the network or the apparatus controller.

Selecting at least one covered user equipment may comprise: identifying a plurality of lists of covered user equipment, each list having a different priority; selecting a list with a highest priority; and selecting at least one covered user equipment within the selected list.

The apparatus may comprise circuitry configured to: select at least one subsequent covered user equipment within the selected list; send, to the at least one subsequent covered user equipment, a searching message; and receive, from the at least one subsequent covered user equipment, the searching result message, wherein the selecting, the sending and the receiving are repeated until a condition is met.

The condition may be that each non-covered user equipment has been indicated to the apparatus in at least one searching result message or each covered user equipment within the list has been selected.

The apparatus may comprise circuitry configured to: receive information indicating a radio resource to be used by the apparatus to send a searching message to the at least one covered user equipment.

The apparatus may comprise circuitry configured to: receive information indicating a beam to be used by the apparatus to send a searching message to the at least one covered user equipment.

The searching message may be a unicast message.

The searching message may be a multicast message or a broadcast message.

The multicast message or the broadcast message may comprise information indicating the at least one covered user equipment and/or time instants for the at least one covered user equipment to send a discovery message to the at least one non-covered user equipment, the discovery message may comprise an indication that the at least one non-covered user equipment is to send a discovery result message to the at least one covered user equipment; and the discovery result message may comprise an indication that the at least one non-covered user equipment received a discovery message.

The apparatus may comprise circuitry configured to: send, to the at least one covered user equipment, a data relaying message, the relaying message may comprise an indication that the at least one covered user equipment has been selected to relay data between the apparatus and the at least one non-covered user equipment.

The apparatus may be a user equipment.

The user equipment and/or the at least one covered user equipment may be an unmanned aerial vehicle.

According to an aspect there is provided a method comprising: selecting at least one covered user equipment among a plurality of covered user equipment inside the coverage area of the apparatus; sending, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receiving, from the at least one covered user equipment, the searching result message.

The at least one covered user equipment may be at an edge of the coverage area of the apparatus Selecting at least one covered user equipment may comprises: identifying a list of covered user equipment and assigning a priority to each covered user equipment; and selecting at least one covered user equipment with a highest priority within the list.

The priority may be determined based on a distance between the at least one covered user equipment and the apparatus and/or a quality of service between the at least one covered user equipment and the apparatus; and the at least one covered user equipment with the highest priority may be the at least one covered user equipment with the longest distance between the at least one covered user equipment and the apparatus and/or the lowest quality of service above a threshold between the at least one covered user equipment and the apparatus.

The method may comprise: selecting at least one subsequent covered user equipment with a subsequent highest priority within the list; sending, to the at least one subsequent covered user equipment, a searching message; and receiving, from the at least one subsequent covered user equipment, the searching result message, wherein the selecting, the sending and the receiving are repeated until a condition is met.

Selecting at least one covered user equipment may comprise: identifying a list of covered user equipment, each covered user equipment having a same priority; and selecting at least one covered user equipment randomly within the list.

The method may comprise: selecting at least one subsequent covered user equipment randomly within the list; sending, to the at least one subsequent covered user equipment, a searching message; and receiving, from the at least one subsequent sending and the receiving are repeated until a condition is met.

Identifying a list of covered user equipment may comprise: receiving the list of covered user equipment from a network or an apparatus controller.

Each covered user equipment may have a priority determined by the apparatus or by the network or the apparatus controller.

Selecting at least one covered user equipment may comprise: identifying a plurality of lists of covered user equipment, each list having a different priority; selecting a list with a highest priority; and selecting at least one covered user equipment within the selected list.

The method may comprise: selecting at least one subsequent covered user equipment within the selected list; sending, to the at least one subsequent covered user equipment, a searching message; and receiving, from the at least one subsequent covered user equipment, the searching result message, wherein the selecting, the sending and the receiving are repeated until a condition is met.

The condition may be that each non-covered user equipment has been indicated to the apparatus in at least one searching result message or each covered user equipment within the list has been selected.

The method may comprise: receiving information indicating a radio resource to be used by the apparatus to send a searching message to the at least one covered user equipment.

The method may comprise: receiving information indicating a beam to be used by the apparatus to send a searching message to the at least one covered user equipment.

The searching message may be a unicast message.

The searching message may be a multicast message or a broadcast message.

The multicast message or the broadcast message may comprise information indicating the at least one covered user equipment and/or time instants for the at least one covered user equipment to send a discovery message to the at least one non-covered user equipment, the discovery message may comprise an indication that the at least one non-covered user equipment is to send a discovery result message to the at least one covered user equipment; and the discovery result message may comprise an indication that the at least one non-covered user equipment received a discovery message.

The method may comprise: sending, to the at least one covered user equipment, a data relaying message, the relaying message may comprise an indication that the at least one covered user equipment has been selected to relay data between the apparatus and the at least one non-covered user equipment.

The method may be performed by a user equipment.

The user equipment and/or the at least one covered user equipment may be an unmanned aerial vehicle.

According to an aspect there is provided a computer program comprising computer executable code which when run on at least one processor is configured to: select at least one covered user equipment among a plurality of covered user equipment inside the coverage area of the apparatus; send, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receive, from the at least one covered user equipment, the searching result message.

The at least one covered user equipment may be at an edge of the coverage area of the apparatus Selecting at least one covered user equipment may comprises: identifying a list of covered user equipment and assigning a priority to each covered user equipment; and selecting at least one covered user equipment with a highest priority within the list.

The priority may be determined based on a distance between the at least one covered user equipment and the apparatus and/or a quality of service between the at least one covered user equipment and the apparatus; and the at least one covered user equipment with the highest priority may be the at least one covered user equipment with the longest distance between the at least one covered user equipment and the apparatus and/or the lowest quality of service above a threshold between the at least one covered user equipment and the apparatus.

The computer program may comprise computer executable code which when run on at least one processor is configured to: select at least one subsequent covered user equipment with a subsequent highest priority within the list; send, to the at least one subsequent covered user equipment, a searching message; and receive, from the at least one subsequent covered user equipment, the searching result message, wherein the selecting, the sending and the receiving are repeated until a condition is met.

Selecting at least one covered user equipment may comprise: identifying a list of covered user equipment, each covered user equipment having a same priority; and selecting at least one covered user equipment randomly within the list.

The computer program may comprise computer executable code which when run on at least one processor is configured to: select at least one subsequent covered user equipment randomly within the list; send, to the at least one subsequent covered user equipment, a searching message; and receive, from the at least one subsequent sending and the receiving are repeated until a condition is met.

Identifying a list of covered user equipment may comprise: receiving the list of covered user equipment from a network or an apparatus controller.

Each covered user equipment may have a priority determined by the apparatus or by the network or the apparatus controller.

Selecting at least one covered user equipment may comprise: identifying a plurality of lists of covered user equipment, each list having a different priority; selecting a list with a highest priority; and selecting at least one covered user equipment within the selected list.

The computer program may comprise computer executable code which when run on at least one processor is configured to: select at least one subsequent covered user equipment within the selected list; send, to the at least one subsequent covered user equipment, a searching message; and receive, from the at least one subsequent covered user equipment, the searching result message, wherein the selecting, the sending and the receiving are repeated until a condition is met.

The condition may be that each non-covered user equipment has been indicated to the apparatus in at least one searching result message or each covered user equipment within the list has been selected.

The computer program may comprise computer executable code which when run on at least one processor is configured to: receive information indicating a radio resource to be used by the apparatus to send a searching message to the at least one covered user equipment.

The computer program may comprise computer executable code which when run on at least one processor is configured to: receive information indicating a beam to be used by the apparatus to send a searching message to the at least one covered user equipment.

The searching message may be a unicast message.

The searching message may be a multicast message or a broadcast message.

The multicast message or the broadcast message may comprise information indicating the at least one covered user equipment and/or time instants for the at least one covered user equipment to send a discovery message to the at least one non-covered user equipment, the discovery message may comprise an indication that the at least one non-covered user equipment is to send a discovery result message to the at least one covered user equipment; and the discovery result message may comprise an indication that the at least one non-covered user equipment received a discovery message.

The computer program may comprise computer executable code which when run on at least one processor is configured to: send, to the at least one covered user equipment, a data relaying message, the relaying message may comprise an indication that the at least one covered user equipment has been selected to relay data between the apparatus and the at least one non-covered user equipment.

The at least one processor may be part of a user equipment.

The user equipment and/or the at least one covered user equipment may be an unmanned aerial vehicle.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

List of Abbreviations

AF: Application Function
AMF: Access Management Function
API: Application Protocol Interface
BS: Base Station
CU: Centralized Unit
DL: Downlink
DU: Distributed Unit
gNB: gNodeB
GSM: Global System for Mobile communication
HSS: Home Subscriber Server
IoT: Internet of Things
LTE: Long Term Evolution
MAC: Medium Access Control
MS: Mobile Station
MTC: Machine Type Communication
NEF: Network Exposure Function
NF: Network Function
NR: New radio
NRF: Network function Repository Function
PDU: Packet Data Unit
QoS: Quality of Service
RAM: Random Access Memory
(R)AN: (Radio) Access Network
ROM: Read Only Memory
SMF: Session Management Function
NSSAI: Network Slice Selection Assistance Information
TR: Technical Report
TS: Technical Specification
UAV: Unmanned Aerial Vehicle
UE: User Equipment
UMTS: Universal Mobile Telecommunication System
3GPP: $3^{rd}$ Generation Partnership Project
5G: $5^{th}$ Generation
5GC: 5G Core network
5GS: 5G System

BRIEF DESCRIPTION OF THE FIGURES

Embodiments will now be described, by way of example only, with reference to the accompanying Figures in which:

FIG. 6 shows a block diagram of a method performed by a terminal for searching non-covered terminal in a communication system.

DETAILED DESCRIPTION OF THE FIGURES

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
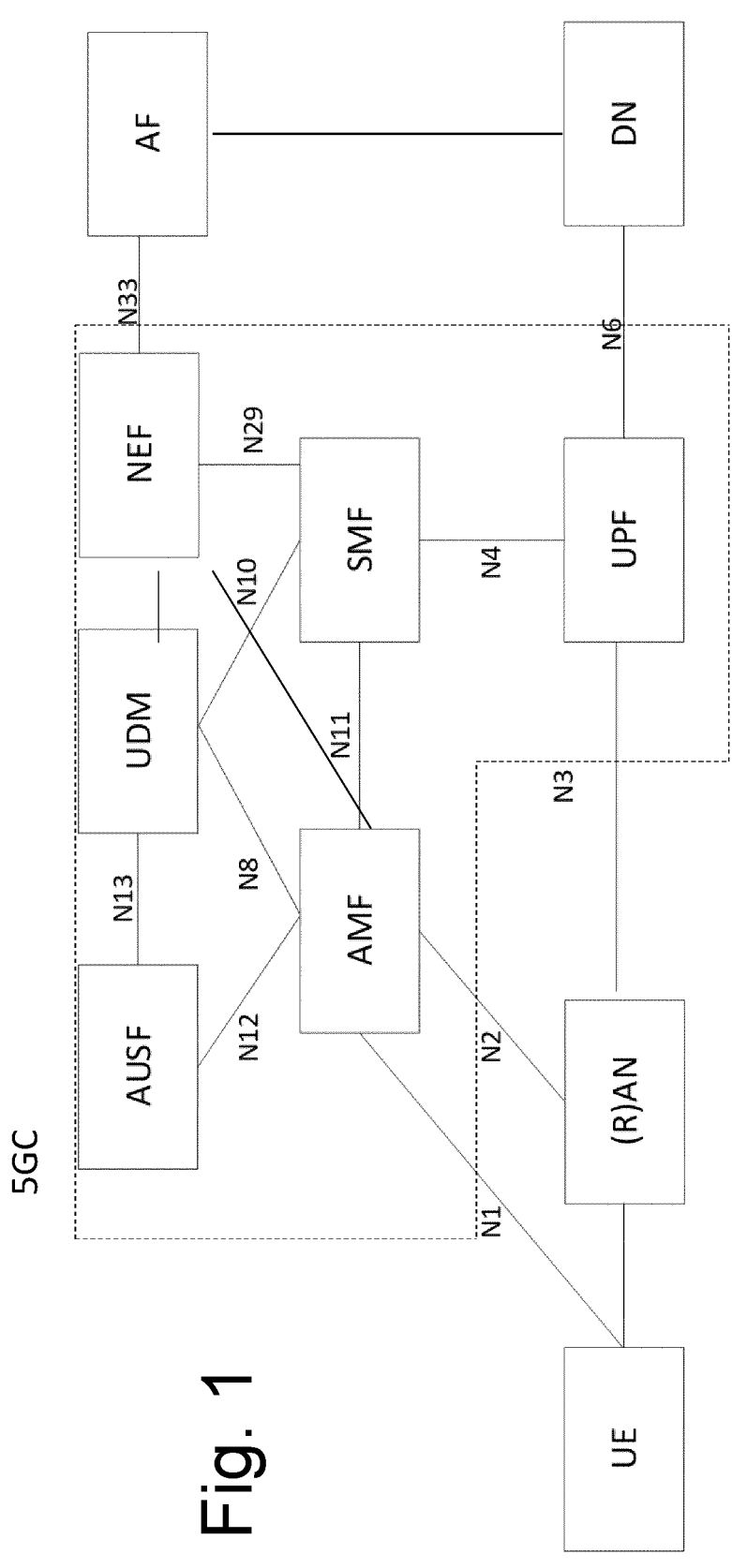
FIG. 1 shows a schematic representation of a 5G system.

FIG. 1 shows a schematic representation of a 5G system (5GS). The 5GS may comprises a terminal, a (radio) access network ((R)AN), a 5G core network (5GC), one or more application functions (AF) and one or more data networks (DN).

The 5G (R)AN may comprise one or more gNodeB (gNB) distributed unit functions connected to one or more gNodeB (gNB) centralized unit functions.

The 5GC may comprise an access management function (AMF), a session management function (SMF), an authentication server function (AUSF), a user data management (UDM), a user plane function (UPF) and/or a network exposure function (NEF). Although not illustrated the 5GC may comprise other network functions (NF), such as an unstructured data storage function (UDSF).

Figure 2:
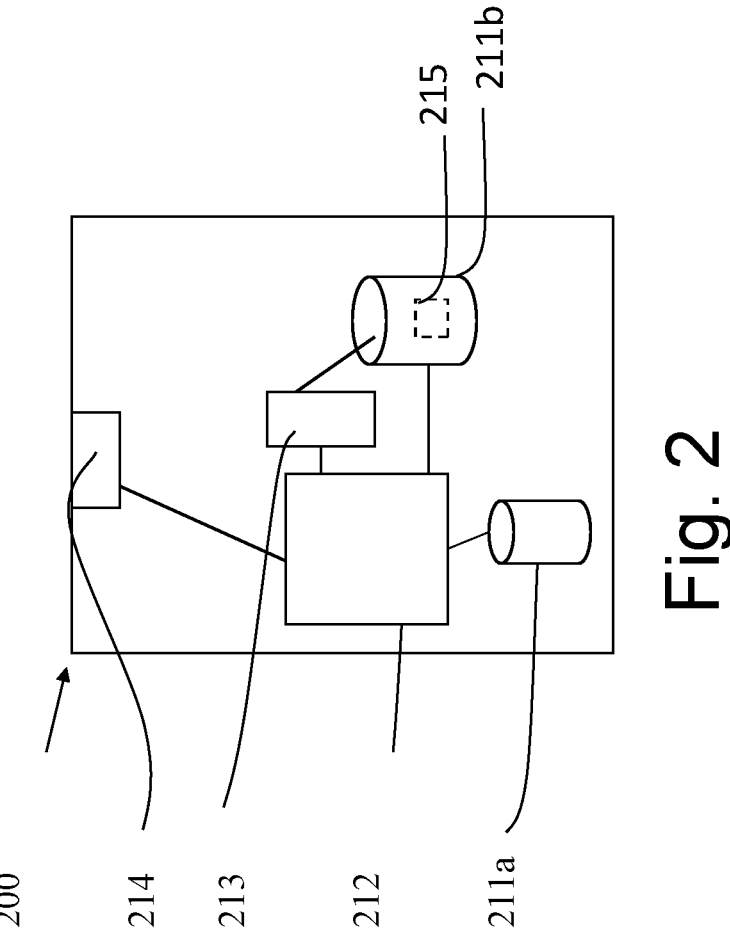
FIG. 2 shows a schematic representation of a control apparatus.

FIG. 2 illustrates an example of a control apparatus 200 for controlling a function of the (R)AN or the 5GC as illustrated on FIG. 1. The control apparatus may comprise at least one random access memory (RAM) 211*a*, at least on read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5G (R)AN or the 5GC. In some embodiments, each function of the (R)AN or the 5GC comprises a control apparatus 200. In alternative embodiments, two or more functions of the (R)AN or the may share a control apparatus.

Figure 3:
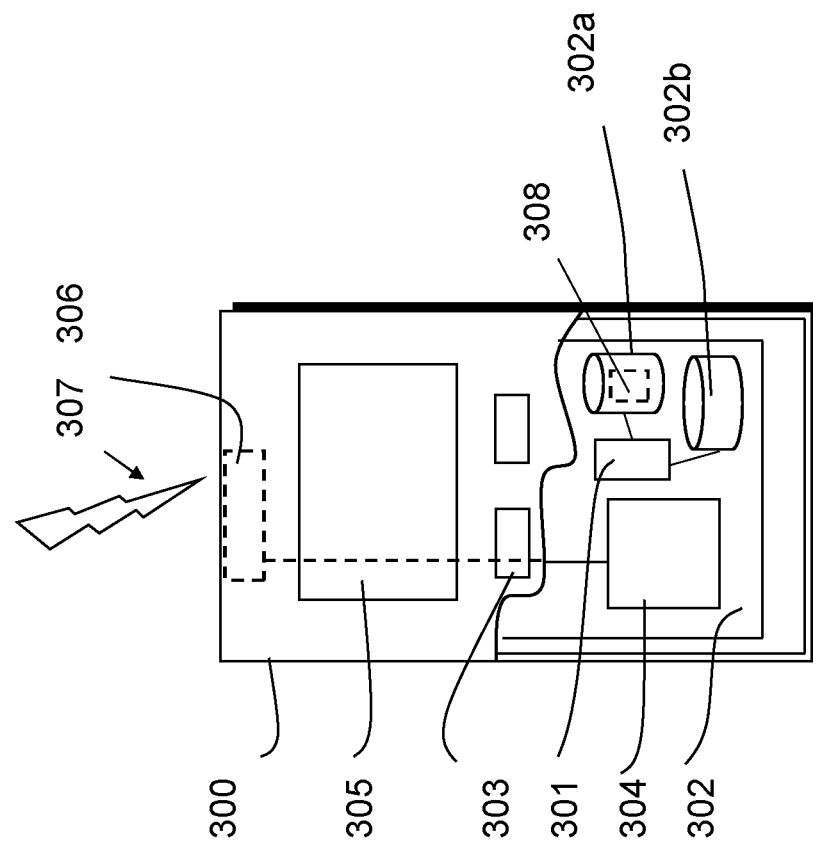
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, an unmanned aerial vehicle (UAV), a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*a* and the ROM 211*b*. The at least one processor 301 may be configured to execute an appropriate software code 308. The software code 308 may for example allow to perform one or more of the present aspects. The software code 308 may be stored in the ROM 302*b*.

The processor, storage and other relevant control apparatus can be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

Wireless communication between a UAV and a UAV controller via LTE network has been supported since LTE Rel-15 for non-line-of-sight communication between the LTE network and each UAV. The corresponding enhancements include UAV identification, UAV flight path information collection, and so on. However, in some cases, one group of UAVs might need to fly together from one place to another place, so it might be better to use UAV-to-UAV communication instead of UAV-to-BS or UAV-to-BS-to-UAV for UAV group communication with the concentration of interference, latency and reliability. Therefore, the optimization of NR network supporting UAV group communication may expected.

In solutions for UE discovery in group communication, UE discovery is achieved by using discovery message (or the message like discovery message) broadcasted by a source UE (i.e. discoverer) in a group. Interested UE(s) (i.e. discoveree(s)) receiving the discovery message may send feedback to the source UE (i.e. discoverers) for joining the group. If this discovery message includes a relay indication, then the interested UE may operate as a relay and may forward the discovery message according to quality of service (QoS) requirements, current traffic load of the interested UE, the radio conditions between the source UE and the interested UE, or some other policies (e.g. it only serves some specific UEs or services).

However, during UAV group establishment, if all UAVs receiving this discovery message with given conditions above forward this discovery message, then strong interference may be generated especially for a UAV group with a large amount of UAV members in a small area. Moreover, additional power consumption for all UAVs may be needed.

One or more aspects of this disclosure provide solutions for UE discovery enhancement in UE group communication with the consideration of power consumption and interference mitigation.

More specifically, one or more aspects of this disclosure provide solutions for UAV discovery enhancement in UAV group communication with the consideration of power consumption and interference mitigation.

Solutions in LTE and NR networks and solutions in 3GPP for LTE and NR networks about UE discovery in group communication may include the following.

In LTE network solutions may include direct UE discovery for one UE to find other interested UE(s). If the UE is a UE-to-Network relay UE, then it is called single-hop UE-to-Network relay discovery.

In NR network solutions may include direct UE discovery for one UE to find other interested UE(s) with possible new dynamic metadata exchange between two UEs after the discovery message. What may be transmitted in metadata message is for future study. For commercial application, a source UE may get application layer group ID, destination layer-2 ID, and destination IP address which are obtained from an application server after receiving a group communication candidate list including itself and interested UE(s). The source UE may send the application layer group ID, and destination layer-2 ID to the interested UE(s). The interested UE(s) may get the destination IP address from the application Server by submitting the received application layer group ID.

In NR network solutions may include direct UE discovery in application layer.

In NR network solutions may include single-hop UE-to-UE discovery. The source UE may send a discovery message including one-bit relay information to indicate whether interested UE(s) may operate as a relay and should forward the discovery message or not according to QoS requirements, current traffic load of the interested UE(s), the radio conditions between the source UE and the interested UE(s), or some other policies (e.g. it only serves some specific UEs or services).

One or more aspects of this disclosure provide a mechanism for connecting a group of UEs to a primary UE that may have a connection to a network. The primary UE may select certain covered UE(s) within the group of UEs to be relay UEs for uncovered/lost UE(s) searching and connection.

Covered UE(s) may be inside the coverage area of the primary UE. Uncovered/lost UE(s) may be outside the coverage area of the primary UE The primary UE may identify covered UE(s). The covered UE(s) may comprise UE(s) inside the coverage area of the primary UE. The covered UE(s) may comprise UE(s) connected to the primary UE. The primary UE may identify uncovered UE(s) outside the coverage area of the primary UE.

The primary UE may select covered UE(s) among the identified covered UE(s). For example, the primary UE may select distant covered UE(s) located at the edge of the coverage area of the primary UE.

The primary UE may transmit a searching message to the distant covered UE(s), indicating that it has been selected to operate as a relay UE for uncovered UE searching.

The primary UE may receive a searching result message from the distant covered UE(s) comprising information indicating uncovered UE(s) the distant covered UE(s) can reach.

The primary UE may identify which of the distant covered UE(s) can reach uncovered UE(s).

The primary UE may transmit a message to the distant covered UE(s) that can reach uncovered UE(s) comprising information indicating that the distant covered UE(s) has been selected to operate as a relay UE for data exchange.

Figure 4:
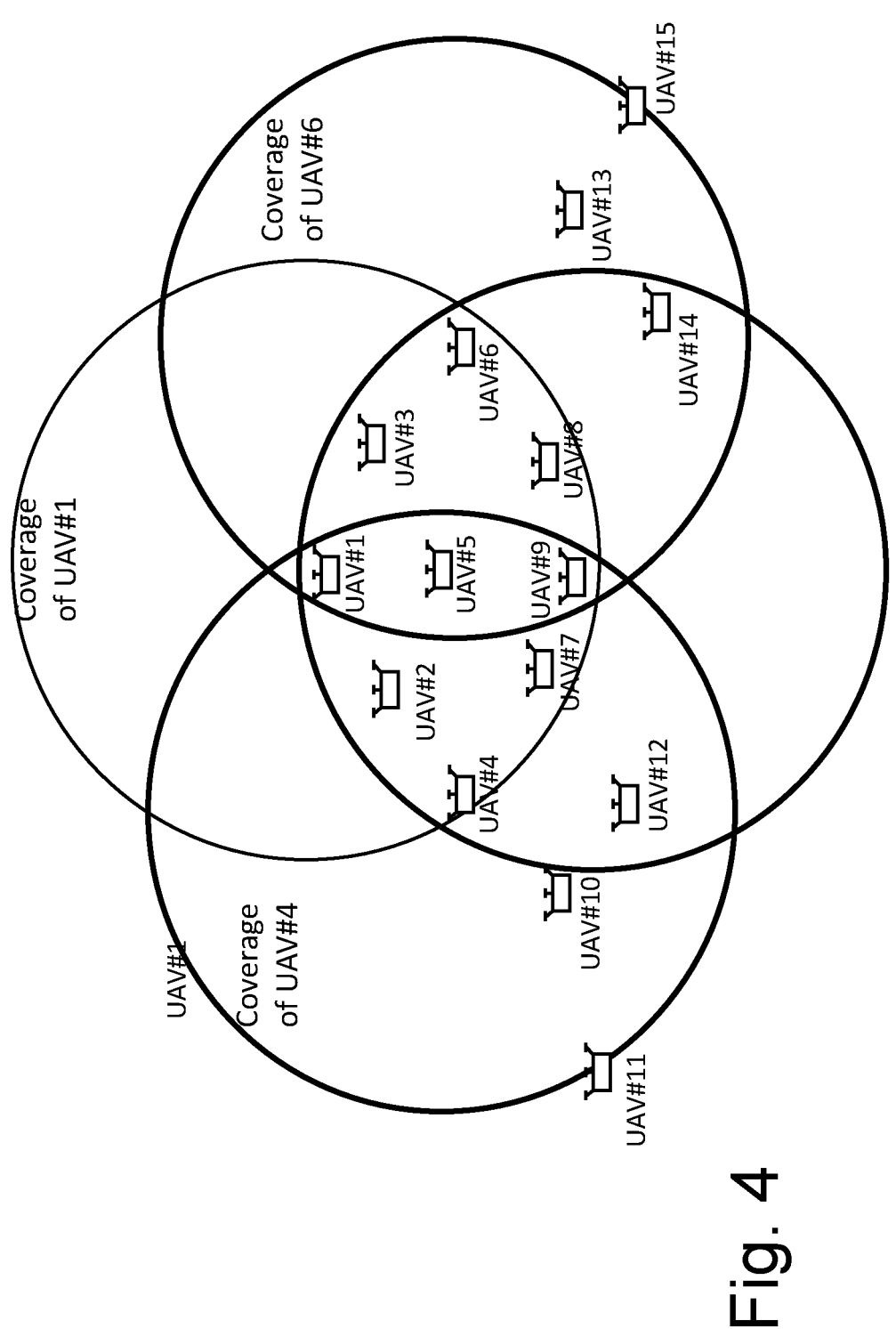
FIG. 4 shows a schematic representation of a communication system comprising a plurality of terminals.

FIG. 4 describes a communication system comprising UAV #1 to UAV #15. UAV #1 may primary UE. UAV #2 to UAV #9 may be covered UEs inside the coverage area of UAV #1. UAV #4, UAV #6 and UAV #9 may be distant covered UEs at the edge of the coverage area of UAV #1. UAV #10 to UAV #15 may be uncovered UEs outside the coverage area of UAV #1. UAV #10 to UAV #12 may be inside the coverage area of UAV #4. UAV #13 to UAV #15 may be inside the coverage area of UAV #6. UAV #12 and UAV #14 may be inside the coverage area of UAV #4.

A first implementation will now be discussed.

Step 1: Identification of Covered UEs and Uncovered/Lost UEs

UAV #1 may be configured with UE group information. The UE group information may include at least one of connection priority information, group size, group ID, member ID list, application ID, destination ID, security information and authorization information. The connection priority information may include priority information for connection with a remote controller (for example via network) and priority information for connection as primary UE for UE-to-UE communication.

UAV #1 may store a UE group list comprising UAV #1 to UAV #15.

UAV #1 may broadcast a discovery message to UAV #2 to UAV #15. UAV #1 may receive a discovery result message from UAV #2 to UAV #9. UAV #2 to UAV #9 are covered UEs inside the coverage area of UAV #1. UAV #1 may build direct communication with UAV #2 to UAV #9. UAV #1 may create a connected member list comprising UAV #2 to UAV #9.

UAV #1 may find that UAV #10 to UAV #15 are in the UE group list but not in the connected member list. UAV #10 to UAV #15 are uncovered/lost UEs outside the coverage area of UAV #1.

Step 2: Creation of Connection-Edge UE List and Priority

UAV #1 may create a connection-edge UE list which includes UAV #4, UAV #9, UAV #6, UAV #7, UAV #8, UAV #2 and UAV #3. UAV #1 may allocate a priority to each UE in the connection-edge UE list.

According to a solution, UAV #1 may allocate a different priority to each UE in the connection-edge UE list. UAV #1 may determine a distance from UAV #1 to each UAV in the connection-edge UE list using their positioning information. UAV #1 may sort the connection-edge UE list based on the distance from UAV #1 to each UAV in the connection-edge UE list. For example, UAV #1 may sort the connection-edge UE list in descending order. The UE with the largest distance to UAV #1 is placed at the top of this list. The UE with the shortest distance to UAV #1 is placed at the bottom of this list.

UAV #1 may start from the top of the connection-edge UE list and selects the covered UEs. The UAV #1 may instruct the covered UEs to operate as a UE searching relay one by one for a certain time duration for extended discovery until a given condition is satisfied. The given condition may be that all UAV members in its UE group list have been found.

According to another solution, UAV #1 may sort the connection-edge UE list based on the distance from UAV #1 to each UAV in the connection-edge UE list and further based on one or more parameters such as position information of each UAV in the connection-edge UE list and/or QoS characteristic(s) between UAV #1 to each UAV in the connection-edge UE list. QoS characteristic(s) may comprise signal strength, signal quality, pathloss information, traffic load, power level, and/or other UE capabilities, such as transmit antenna number, receive antenna number, remaining flight time, communication range, etc.

In another solution: UAV #1 may allocate a same priority to each UE in the connection-edge UE list. UAV #1 may select the covered UEs randomly within the connection-edge UE list.

Step 3: Selection of Covered UE for Uncovered/Lost UE Searching

UAV #1 may select UAV #4 for uncovered/lost UE searching based on one of the solutions discussed above.

Step 4: Transmission of Searching Message

UAV #1 may send a searching message to UAV #4. UAV #4 may broadcast a discovery message. UAV #4 may receive a discovery result message from UAV #10, UAV #11 and UAV #12.

A searching message may be a unicast message. Alternatively, the searching message may be a multicast or broadcast message containing selected UAV ID(s) and/or the time instant(s) when a discovery message should be broadcasted by the selected UAV(s). It will be understood that UAVs that are selected to broadcast a discovery message at the same time instant should be sufficiently far away from each other to minimize the mutual interference.

A searching message may include at least one of source ID, destination ID, application ID, discovery extension request, transmission power level, and extended coverage level as well.

Step 5: Reception of Searching Result Message

UAV #1 may receive a searching result message from UAV #4 comprising information indicating that UAV #4 can reach UAV #10, UAV #11 and UAV #12.

Step 6: Connection with Uncovered/Lost UE

UAV #1 may identify that UAV #4 can operate as a data exchange relay between UAV #1 and UAV #10, UAV #11 and UAV #12.

UAV #1 may instruct UAV #4 to operate as a data exchange relay between UAV #1 and UAV #10, UAV #11 and UAV #12.

Steps 4 to 6 may be repeated but UAV #4 is replaced by UAV #9 and UAV #1 may instruct UAV #9 to operate as a data exchange relay between UAV #1 and UAV #14.

Steps 4 to 6 may be further repeated but UAV #4 is replaced by UAV #6 and UAV #1 may instruct UAV #6 to operate as a data exchange relay between UAV #1 and UAV #13 and UAV #15.

A second implementation will now be discussed.

A difference between the first implementation and the second implementation is that in step 2 (Creation of connection-Edge UE List and Priority) there may be multiple connection-Edge UE Lists. Each list may have a different priority.

In an example there may be four connection-Edge UE Lists:

List 1: (UAV #4, UAV #6) with the first highest priority,

List 2: (UAV #9) with the second highest priority,

List 3: (UAV #2 and UAV #3) with the third highest priority,

List 4: (UAV #7 and UAV #8) with the fourth highest priority.

UAV #2 to UAV #9 may be combined in lists so that UAVs in a list may be distant from each other to provide good searching range and to quickly discover uncovered/lost UAVs UAV #10 to UAV #15. For example, UAV #1 can use the coverage area of UAV #2 to UAV #9 to find the optimal combination (i.e. the smallest combination of UAVs for the biggest searching range).

In the example since List 1 may achieve a good searching range, no traversal for List 2 to List 4 may be performed to save searching time and energy power.

A third implementation will now be discussed.

A difference between the second implementation and the third implementation is that in step 3 (Selection of covered UE for uncovered/lost UE searching) UAV #1 may send a searching message to multiple UAVs at the same time or at short time interval.

For example, UAV #1 may send a searching message to both UAV #4 and UAV #6 in List 1 at the same time. Due to the good searching range provided by these two UAVs, no searching message may be needed.

As explained above a searching message may be a unicast message. Alternatively, the searching message may be a multicast or broadcast message containing selected UAV ID(s) and/or the time instant(s) when a discovery message should be broadcasted by the selected UAV(s). It will be understood that UAVs that are selected to broadcast a discovery message at the same time instant should be sufficiently far away from each other to minimize the mutual interference.

A searching message may include at least one of source ID, destination ID, application ID, discovery extension request, transmission power level, and extended coverage level as well.

A fourth implementation will now be discussed.

A difference between the first implementation, the second implementation, the third implementation and the fourth implementation is that in step 2 (Creation of connection-Edge UE List and Priority) the connection-edge UE list(s) and/or priority(ies) may be determined by a network (e.g. gNB) or a UAV controller.

In one example the network or UAV controller has the positioning information of each UAV, which allows it to determine connection-edge UE list(s) and/or priority(ies). Then, the network may send the connection-edge UE list(s) and/or priority(ies) to UAV #1.

Moreover, the network or UAV controller may provide a resource allocation to UAV #1. For example, the network or UAV controller may provide to UAV #1 radio resource and/or beam to be used to transmit a searching message. The radio resource and/or beam may be determined by the network or UAV controller based on network conditions, such as interference or other.

Figure 5:
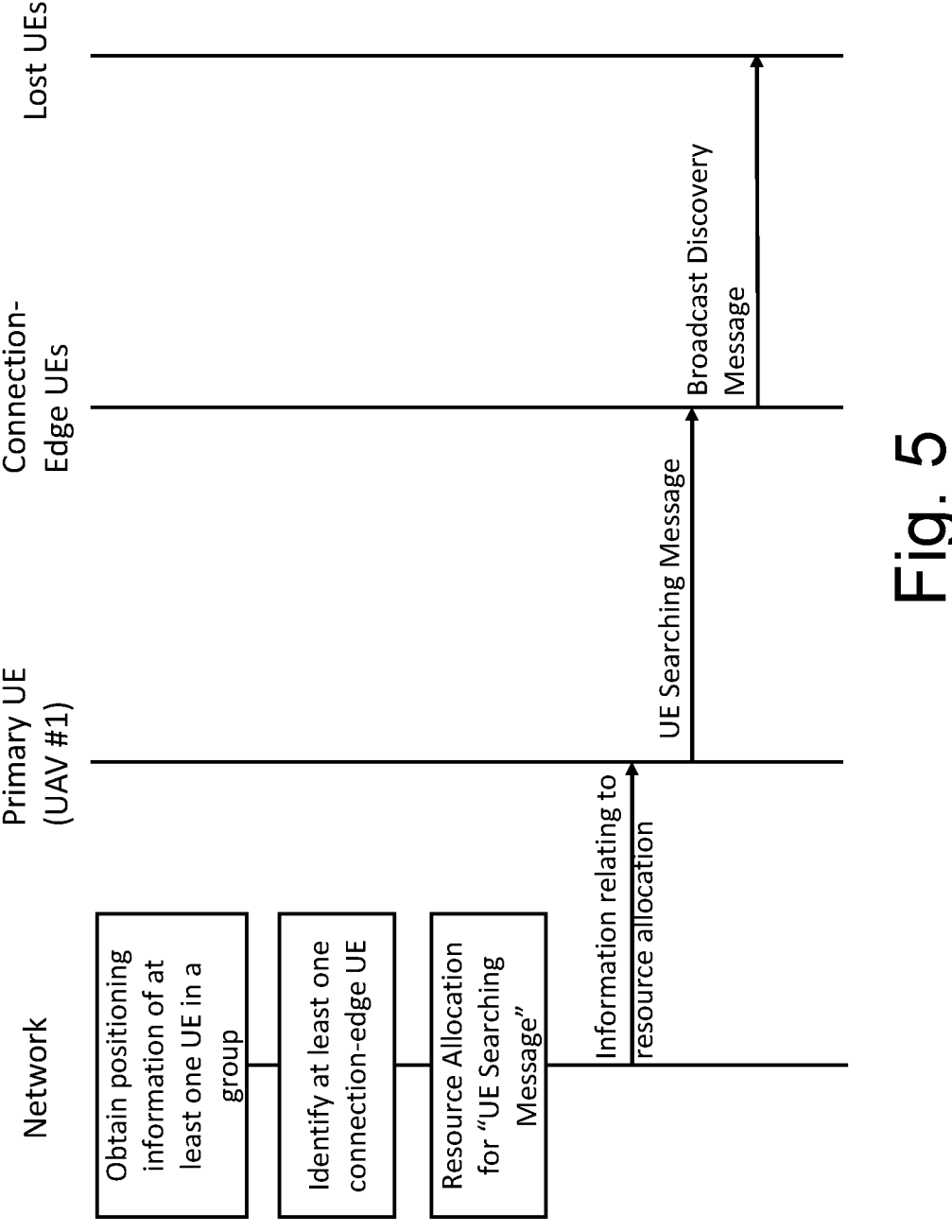
FIG. 5 shows a signalling diagram of a process for searching non-covered terminal in a communication system.

FIG. 5 shows a signalling diagram of a process for identifying non-covered UEs in a communication system as per the fourth implementation.

The network may obtain positioning information of all UEs in a group.

The network may identify at least one covered UE inside the coverage area of the primary UE and at the edge of the coverage area of the primary UE (i.e. connection edge UE).

The network may determine a resource allocation.

The network may send connection-edge UE list(s) and/or priority(ies) to the primary UE. The network may send the resource allocation to the primary UE.

The primary UE may send a search message to the at least one connection edge UE using the resource allocation.

The at least one connection edge UE may broadcast a discovery message to at least one uncovered/lost UE.

In another example the network or UAV controller has the positioning information of each UAV. However, the network or UAV controller does not determine connection-edge UE list(s) and/or priority(ies) and does not send the connection-edge UE list(s) and/or priority(ies) to UAV #1.

The network or UAV controller may send the positioning information of each UAV to UAV #1 and UAV #1 may determine connection-edge UE list(s) and/or priority(ies).

In the above examples, other information may be used by the network, the UAV controller or UAV #1 to determine connection-edge UE list(s) and/or priority(ies). The information may include QoS characteristic, such as signal strength, signal quality, pathloss information, traffic load, power level, and/or other UAV capabilities transmit antenna number, receive antenna number, remaining flight time, communication range, etc.

FIG. 6 shows a block diagram of a method performed by an apparatus for identifying non-covered apparatuses in a communication system. The apparatus may be a UE, such as a UAV.

In step 600, the apparatus may select at least one covered UE among a plurality of covered UE inside the coverage area of the apparatus. The at least one covered UE may be a UAV. The at least one covered UE may be at an edge of the coverage area of the apparatus.

In step 602, the apparatus may send, to the at least one covered UE, a searching message. The searching message may comprise an indication that the at least one covered UE is to send a searching result message to the apparatus. The searching result message may comprise an indication of at least one non-covered UE located outside the coverage area of the apparatus and inside a coverage area of the at least one covered UE.

In step 604, the apparatus may receive, from the at least one covered UE, the searching result message.

In an implementation, selecting at least one covered UE may comprise: identifying a list of covered UE and assigning a priority to each covered UE; and selecting at least one covered UE with a highest priority within the list.

The priority may be determined based on a distance between the covered UE and the apparatus and/or a quality of service between the covered UE and the apparatus. The at least one covered UE with the highest priority is the at least one covered UE with the longest distance between the at least one covered UE and the apparatus and/or the lowest quality of service above a threshold between the covered UE and the apparatus.

The apparatus may select at least one subsequent covered UE with a subsequent highest priority within the list. The apparatus may send, to the at least one subsequent covered UE, a searching message. The apparatus may receive, from the at least one subsequent covered UE, the searching result message. The selecting, the sending and the receiving may be repeated until a condition is met.

The condition may be that each non-covered UE has been indicated to the apparatus in at least one searching result message or each covered UE within the list has been selected.

In another implementation, selecting at least one covered UE may comprise: identifying a list of covered UE, each covered UE having a same priority; and selecting at least one covered UE randomly within the list.

The apparatus may select at least one subsequent covered UE randomly within the list. The apparatus may send, to the at least one subsequent covered UE, a searching message. The apparatus may receive, from the at least one subsequent covered UE, the searching result message. The selecting, the sending and the receiving may be repeated until a condition is met.

The condition may be that each non-covered UE has been indicated to the apparatus in at least one searching result message or each covered UE within the list has been selected.

Identifying a list of covered UE may comprise: receiving the list of covered UE from a network or an apparatus controller. Each covered UE may have a priority determined by the apparatus or by the network or the apparatus controller.

In another implementation selecting at least one covered UE may comprise: identifying a plurality of lists of covered UE, each list having a different priority; selecting a list with a highest priority; and selecting at least one covered UE within the selected list. The apparatus may select at least one subsequent covered UE within the selected list. The UE may send, to the at least one subsequent covered UE, a searching message. The apparatus may receive, from the at least one subsequent covered UE, the searching result message. The selecting, the sending and the receiving may be repeated until a condition is met.

The condition may be that each non-covered UE has been indicated to the apparatus in at least one searching result message or each covered UE within the list has been selected.

The apparatus may receiving information indicating a radio resource to be used by the apparatus to send a searching message to the at least one covered UE.

The apparatus may receive information indicating a beam to be used by the apparatus to send a searching message to the at least one covered UE.

The searching message may be a unicast message. The searching message may be a multicast message or a broadcast message. The multicast message or the broadcast message may comprises information indicating the at least one covered UE and/or time instants for the at least one covered UE to send a discovery message to the at least one non-covered UE. The discovery message may comprise an indication that the at least one non-covered UE is to send a discovery result message to the at least one covered UE. The discovery result message may comprise an indication that the at least one non-covered UE received a discovery message.

The apparatus may send, to the at least one covered UE, a data relaying message. The relaying message may comprise an indication that the at least one covered UE has been selected to relay data between the apparatus and the at least one non-covered UE.

Figure 7:
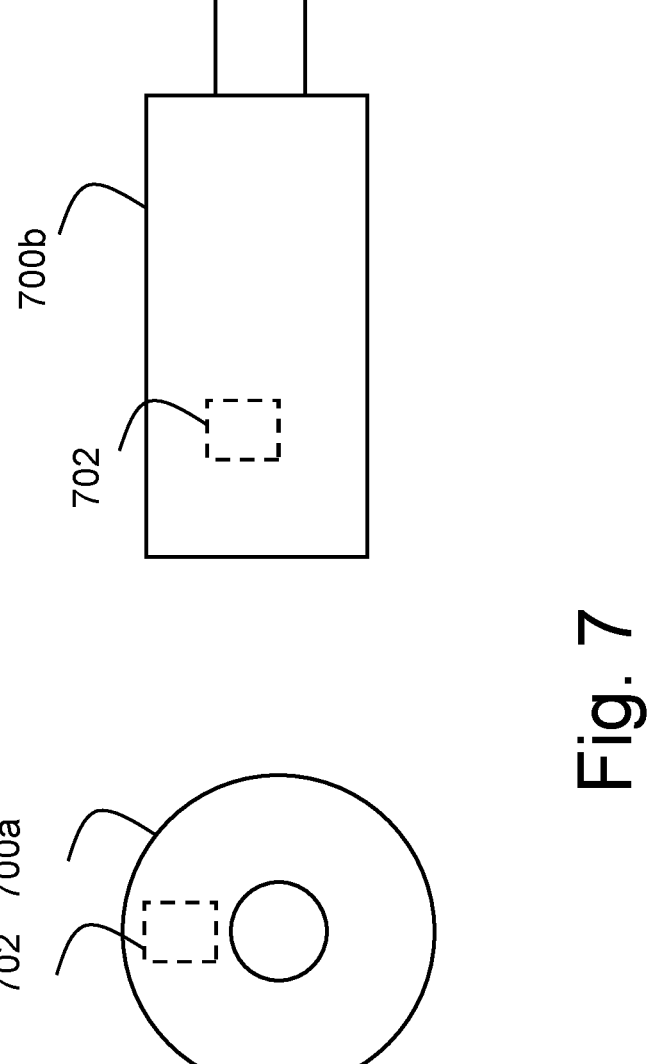
FIG. 7 shows a schematic representation of a non-volatile memory medium storing instructions which when executed by a processor allow a processor to perform one or more of the steps of the method of FIG. 6.

FIG. 7 shows a schematic representation of non-volatile memory media 700a (e.g. computer disc (CD) or digital versatile disc (DVD)) and 700b (e.g. universal serial bus (USB) memory stick) storing instructions and/or parameters 702 which when executed by a processor allow the processor to perform one or more of the steps of the methods of Figure.

It is noted that while the above describes example embodiments, there are several variations and modifications which may be made to the disclosed solution without departing from the scope of the present invention.

It will be understood that although the above concepts have been discussed in the context of a 5GS, one or more of these concepts may be applied to other cellular systems.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any procedures, e.g., as in FIG. 6, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some embodiments may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:

(a) hardware-only circuit implementations (such as implementations in only analogue and/or digital circuitry);

(b) combinations of hardware circuits and software, such as:

(i) a combination of analogue and/or digital hardware circuit(s) with software/firmware and (ii) any portions of hardware processor(s) with software (including digital signal processor(s)), software, and memory(ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus, comprising:

at least one processor; and at least one non-transitory memory storing instructions that, when executed with the at least one processor, cause the apparatus to perform:

selecting at least one covered user equipment among a plurality of covered user equipment inside a coverage area of the apparatus;

sending, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receiving, from the at least one covered user equipment, the searching result message.

2. The apparatus of claim 1, wherein the at least one covered user equipment is at an edge of the coverage area of the apparatus.

3. The apparatus of claim 1, wherein the instructions, when executed with the at least one processor, cause the apparatus to perform:

identifying a list of covered user equipment and assigning a priority to the covered user equipment; and selecting at least one covered user equipment with a highest priority within the list.

4. The apparatus of claim 3, wherein the priority is determined based on at least one of a distance between the at least one covered user equipment and the apparatus or a quality of service between the at least one covered user equipment and the apparatus; and wherein the at least one covered user equipment with the highest priority is the at least one covered user equipment with at least one of the longest distance between the at least one covered user equipment and the apparatus or the lowest quality of service above a threshold between the at least one covered user equipment and the apparatus.

5. The apparatus of claim 3, wherein the instructions, when executed with the at least one processor, cause the apparatus to perform:

selecting at least one subsequent covered user equipment with a subsequent highest priority within the list;

sending, to the at least one subsequent covered user equipment, a searching message; and receiving, from the at least one subsequent covered user equipment, the searching result message;

wherein the selecting, the sending, and the receiving are repeated until a condition is met.

6. The apparatus of claim 5, wherein the condition is that the non-covered user equipment has been indicated to the apparatus in at least one searching result message or the covered user equipment within the list has been selected.

7. The apparatus of claim 3, wherein the instructions, when executed with the at least one processor, cause the apparatus to perform:

receiving the list of covered user equipment from a network or an apparatus controller.

8. The apparatus of claim 7, wherein the covered user equipment has a priority determined with the apparatus or with the network or the apparatus controller.

9. The apparatus of claim 1, wherein the instructions, when executed with the at least one processor, cause the apparatus to perform:

identifying a list of covered user equipment, the covered user equipment having a same priority; and selecting at least one covered user equipment randomly within the list.

10. The apparatus of claim 9, wherein the instructions, when executed with the at least one processor, cause the apparatus to perform:

selecting at least one subsequent covered user equipment randomly within the list;

sending, to the at least one subsequent covered user equipment, a searching message; and receiving, from the at least one subsequent covered user equipment, the searching result message;

wherein the selecting, the sending, and the receiving are repeated until a condition is met.

11. The apparatus of claim 1, wherein the instructions, when executed with the at least one processor, cause the apparatus to perform:

identifying a plurality of lists of covered user equipment, the list having a different priority;

selecting a list with a highest priority; and selecting at least one covered user equipment within the selected list.

12. The apparatus of claim 11, wherein the instructions, when executed with the at least one processor, cause the apparatus to perform:

selecting at least one subsequent covered user equipment within the selected list;

sending, to the at least one subsequent covered user equipment, a searching message; and receiving, from the at least one subsequent covered user equipment, the searching result message;

wherein the selecting, the sending, and the receiving are repeated until a condition is met.

13. The apparatus of claim 1, wherein the instructions, when executed with the at least one processor, cause the apparatus to perform:

receiving information indicating a radio resource to be used with the apparatus to send a searching message to the at least one covered user equipment.

14. The apparatus of claim 1, wherein the instructions, when executed with the at least one processor, cause the apparatus to perform:

receiving information indicating a beam to be used with the apparatus to send a searching message to the at least one covered user equipment.

15. The apparatus of claim 1, wherein the searching message is a unicast message.

16. The apparatus of claim 1, wherein the searching message is a multicast message or a broadcast message.

17. The apparatus of claim 16, wherein the multicast message or the broadcast message comprises information indicating at least one of the at least one covered user equipment or time instants for the at least one covered user equipment to send a discovery message to the at least one non-covered user equipment, wherein the discovery message comprises an indication that the at least one non-covered user equipment is to send a discovery result message to the at least one covered user equipment; and wherein the discovery result message comprises an indication that the at least one non-covered user equipment received a discovery message.

18. The apparatus of claim 1, wherein the instructions, when executed with the at least one processor, cause the apparatus to perform:

sending, to the at least one covered user equipment, a data relaying message, wherein the data relaying message comprises an indication that the at least one covered user equipment has been selected to relay data between the apparatus and the at least one non-covered user equipment.

19. The apparatus of claim 1, wherein the apparatus is a user equipment.

20. The apparatus of claim 19, wherein at least one of the user equipment or the at least one covered user equipment is an unmanned aerial vehicle.

21. A method, comprising:

selecting at least one covered user equipment among a plurality of covered user equipment inside the coverage area of the apparatus;

sending, to the at least one covered user equipment, a searching message, wherein the searching message comprises an indication that the at least one covered user equipment is to send a searching result message to the apparatus, wherein the searching result message comprises an indication of at least one non-covered user equipment located outside the coverage area of the apparatus and inside a coverage area of the at least one covered user equipment; and receiving, from the at least one covered user equipment, the searching result message.

22. A non-transitory program storage device readable with an apparatus, tangibly embodying a program of instructions executable with the apparatus for performing the method of claim 21.

* * * * *